United States Patent
Yuzuriha

(10) Patent No.: US 9,660,282 B2
(45) Date of Patent: May 23, 2017

(54) FUEL CELL SYSTEM AND METHOD OF CONTROLLING THE FUEL CELL SYSTEM

(71) Applicant: HONDA MOTOR CO., LTD., Tokyo (JP)

(72) Inventor: Akihito Yuzuriha, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 18 days.

(21) Appl. No.: 14/782,503

(22) PCT Filed: Feb. 20, 2014

(86) PCT No.: PCT/JP2014/054781
§ 371 (c)(1),
(2) Date: Oct. 5, 2015

(87) PCT Pub. No.: WO2014/167907
PCT Pub. Date: Oct. 16, 2014

(65) Prior Publication Data
US 2016/0064756 A1 Mar. 3, 2016

(30) Foreign Application Priority Data

Apr. 10, 2013 (JP) ................................ 2013-082461

(51) Int. Cl.
*H01M 2/00* (2006.01)
*H01M 8/04537* (2016.01)
(Continued)

(52) U.S. Cl.
CPC ......... *H01M 8/04634* (2013.01); *B01J 47/14* (2013.01); *H01M 8/04164* (2013.01);
(Continued)

(58) Field of Classification Search
CPC ..... B01J 47/14; Y02E 60/525; H01M 8/0618; H01M 8/0687; H01M 8/04164;
(Continued)

(56) References Cited

U.S. PATENT DOCUMENTS

2006/0009865 A1* 1/2006 Goldfine ................ G05D 23/26
700/29
2008/0032168 A1* 2/2008 Fujita ................ H01M 8/04029
429/434

FOREIGN PATENT DOCUMENTS

JP 2008-243598 10/2008
JP 2008-276947 11/2008
(Continued)

OTHER PUBLICATIONS

Japanese Office Action dated Jul. 5, 2016 (partial English translation included).

*Primary Examiner* — Mark F Huff
*Assistant Examiner* — Monique Wills
(74) *Attorney, Agent, or Firm* — Rankin, Hill & Clark LLP

(57) ABSTRACT

A control device of a fuel cell system includes an electric conductivity comparing unit for comparing the electric conductivity of the water inside the ion exchanger which is measured by the electric conductivity measuring unit with a predetermined electric conductivity range, and an ion exchange environment determining unit for arbitrarily determining whether or not air has been mixed into an ion exchanger and whether or not the ion exchange efficiency of the ion exchanger has been degraded, based on a comparison result by the electric conductivity comparing unit.

12 Claims, 15 Drawing Sheets

(51) Int. Cl.
  B01J 47/14       (2017.01)
  H01M 8/04828    (2016.01)
  H01M 8/04955    (2016.01)
  H01M 8/0612     (2016.01)
  H01M 8/0662     (2016.01)
  H01M 8/04119    (2016.01)
  H01M 8/04664    (2016.01)
  H01M 8/04746    (2016.01)
  H01M 8/04223    (2016.01)
  H01M 8/06       (2016.01)
  H01M 8/1246     (2016.01)
  H01M 8/24       (2016.01)
  H01M 8/0438     (2016.01)
  H01M 8/04492    (2016.01)
  H01M 8/124      (2016.01)

(52) U.S. Cl.
  CPC ... *H01M 8/04223* (2013.01); *H01M 8/04656* (2013.01); *H01M 8/04686* (2013.01); *H01M 8/04776* (2013.01); *H01M 8/04843* (2013.01); *H01M 8/04955* (2013.01); *H01M 8/06* (2013.01); *H01M 8/0618* (2013.01); *H01M 8/0687* (2013.01); *H01M 8/1246* (2013.01); *H01M 8/24* (2013.01); *H01M 8/04395* (2013.01); *H01M 8/04425* (2013.01); *H01M 8/04492* (2013.01); *H01M 2008/1293* (2013.01); *H01M 2250/20* (2013.01); *H01M 2300/0071* (2013.01); *Y02T 90/32* (2013.01)

(58) Field of Classification Search
  CPC ......... H01M 8/04395; H01M 8/04425; H01M 8/04492; H01M 8/4656
  See application file for complete search history.

(56) References Cited

FOREIGN PATENT DOCUMENTS

JP   2011-029116   2/2011
JP   2011-249185   12/2011

\* cited by examiner

⇒ : WATER PASSING DIRECTION

FIG. 11

| ELECTRIC CONDUCTIVITY σ | STATUS | DETAILS OF PROCESSING |
|---|---|---|
| MORE THAN 30 μS/cm | CONDENSED WATER | DETERMINE DEGRADATION OF EFFICIENCY<br>DISPLAY<br>STOP POWER GENERATION |
| 5 TO 30 μS/cm | PURE WATER | CONTINUE POWER GENERATION |
| LESS THAN 5 μS/cm | AIR | DETERMINE MIXING OF AIR<br>DISPLAY<br>STOP POWER GENERATION |

⇒: WATER PASSING DIRECTION

FUEL CELL SYSTEM AND METHOD OF CONTROLLING THE FUEL CELL SYSTEM

TECHNICAL FIELD

The present invention relates to a fuel cell system including a fuel cell stack formed by stacking a plurality of fuel cells for generating electrical energy by electrochemical reactions of a fuel gas and an oxygen-containing gas. Further, the present invention relates to a method of controlling the fuel cell system.

BACKGROUND ART

Typically, a solid oxide fuel cell (SOFC) employs a solid electrolyte of ion-conductive oxide such as stabilized zirconia. The solid electrolyte is interposed between an anode and a cathode to form an electrolyte electrode assembly (MEA). The electrolyte electrode assembly is interposed between separators (bipolar plates). In use, normally, predetermined numbers of the electrolyte electrode assemblies and the separators are stacked together to form a fuel cell stack.

As the fuel gas supplied to the fuel cell, normally, a hydrogen gas produced from hydrocarbon raw material by a reformer is used. In general, in the reformer, a reforming raw gas is obtained from a hydrocarbon raw fuel of a fossil fuel or the like, such as methane or LNG, and the reforming raw gas undergoes steam reforming to produce a reformed gas (fuel gas).

In the above steam reforming, water in correspondence with a quantity of water vapor used in the reforming reaction needs to be supplied. For this purpose, an approach where a required quantity of water is supplied from the outside has been adopted. Alternatively, a water collection approach by condensing the exhaust gas produced as a result of power generation in the fuel cell to achieve perfect circulation (water self-sustaining operation) of water needed for reforming has been drawing attention. In this regard, it is required to remove impurities from the condensed water. Therefore, water treatment equipment, e.g., an ion exchanger has been adopted.

For example, as shown in FIG. 13, a fuel cell device disclosed in Japanese Laid-Open Patent Publication No. 2008-243598 (hereinafter referred to as conventional technique 1) includes a fuel cell $1a$, a reforming unit $2a$ for producing a fuel gas, raw fuel supply means $3a$ for supplying a raw fuel to the reforming unit $2a$, oxygen-containing gas supply means $4a$ for supplying an oxygen-containing gas to the reforming unit $2a$, and a water pump $5a$ for supplying water to the reforming unit $2a$. Further, the fuel cell device includes water treatment means for treating water to be supplied to the reforming unit $2a$, and a control unit $6a$ for controlling the reforming unit $2a$ to perform steam reforming during steady operation.

Under the control of the control unit $6a$, based on a signal from water quality detecting means $7a$ provided between the water treating means and the reforming unit $2a$, if it is determined that the water quality of the water to be supplied to the reforming unit $2a$ has been degraded, the supply of water by the water pump $5a$ is stopped. Further, the reforming unit $2a$ is controlled to perform partial oxidation reforming by using the raw fuel supplied by the raw fuel supply means $3a$ and the oxygen-containing gas supplied by the oxygen-containing gas supply means $4a$.

Further, as shown in FIG. 14, a fuel cell device disclosed in Japanese Laid-Open Patent Publication No. 2011-029116 (hereinafter referred to as conventional technique 2) includes a heat exchanger $1b$ for performing heat exchange between an exhaust gas and water and a condensed water supply pipe $3b$ for supplying condensed water produced by heat exchange at the heat exchanger $1b$ toward a reformer $2b$. A valve $4b$ is provided in the condensed water supply pipe $3b$, and an electric conductivity sensor $5b$ for measuring electrical conductivity of the condensed water is provided between the heat exchanger $1b$ and the valve $4b$.

The fuel cell device includes a control device $6b$. In the case where the electric conductivity of the condensed water measured by the electric conductivity sensor $5b$ has a predetermined value or less, the control device $6b$ controls the valve $4b$ for supplying the condensed water toward the reformer $2b$. In the case where the electric conductivity of the condensed water measured by the electric conductivity sensor $5b$ has a predetermined value or more, the control device $6b$ controls the valve $4b$ for discharging the condensed water.

Further, as shown in FIG. 15, a fuel cell device disclosed in Japanese Laid-Open Patent Publication No. 2011-249185 (hereinafter referred to as conventional technique 3) includes a fuel cell stack $1c$ for generating electrical energy by reactions of a hydrogen and an oxygen and discharging a gas containing water vapor, a condenser unit $2c$ for condensing the water vapor by cooling the gas to produce the condensed water, and a clean water supply unit $3c$ for supplying clean water.

Further, the fuel cell device includes a tank $4c$ for mixing the condensed water produced by the condenser unit $2c$ and the clean water supplied from the clean water supply unit $3c$ and storing the mixed water as raw material water, a filter $5c$ for purifying the raw material water, an electric conductivity measuring unit $6c$ for measuring electric conductivity of the raw material water after the raw material water has passed through the filter $5c$, and a controller $7c$. The controller $7c$ has functions of a first detection unit for detecting the end of the life of the filter $5c$ based on the measurement result in the electric conductivity measuring unit $6c$, a supply quantity measuring unit for measuring the quantity of the clean water supplied from the clean water supply unit $3c$, and a second detection unit for detecting the end of the life of the filter $5c$ based on the measurement result in the supply quantity measuring unit.

SUMMARY OF INVENTION

The conventional technique 1 has a function of making a determination as to whether or not the quality of the water to be supplied to the reforming unit $2a$ has been degraded. However, it is not possible to determine whether or not air has been mixed with the water to be supplied to the reforming unit $2a$. Therefore, it is not possible to supply a stable and correct quantity of the reforming water. Further, since a partial oxidation reformer needs to be provided in addition to the steam reformer, the number of components is large, and the cost is high.

Further, in the conventional technique 2, it is not possible to determine whether or not air has been mixed with the condensed water supplied to the reformer $2b$. Therefore, it is not possible to supply a stable and correct quantity of the reforming water. Further, since the water is discharged in the case where the electric conductivity of the condensed water is high, shortage of the reforming water may occur undesirably. In order to solve the problem, for example, an external water purifier needs to be provided. Thus, the number of components is large, and the cost is high.

Further, in the conventional technique 3, it is not possible to determine whether or not the air has been mixed into the condensed water to be supplied to the reformer. Therefore, it is not possible to supply a stable and correct quantity of the reforming water. Further, the end of the life of the filter 5c is determined based on the electric conductivity measuring unit 6c for measuring electric conductivity of the raw material water after the raw material water has passed through the filter 5c and the supply quantity measuring unit for measuring the quantity of the clean water supplied from the clean water supply unit 3c. Thus, the number of components is large, and the cost is high.

The present invention has been made to solve the problem of this type, and an object of the present invention is to provide a fuel cell system and a method of controlling the fuel cell system which make it possible to achieve improvement in the ion exchange efficiency, improvement in the durability, reduction in the number of components, reduction in the number of steps of maintenance operation, and suppress mixing of the air into the water as much as possible.

The present invention relates to a fuel cell system including a fuel cell stack formed by stacking a plurality of fuel cells for generating electrical energy by electrochemical reactions of a fuel gas and an oxygen-containing gas, an ion exchanger for allowing water contained in an exhaust gas discharged from the fuel cells to pass through the ion exchanger, an electric conductivity measuring unit for measuring electric conductivity of the water inside the ion exchanger, and a control device for controlling an amount of electrical energy generated in the fuel cell stack. Further, the fuel cell system relates to a method of controlling the fuel cell system.

In this fuel cell system, the control device includes an electric conductivity comparing unit for comparing the electric conductivity measured by the electric conductivity measuring unit with a predetermined electric conductivity range and an ion exchange environment determining unit for arbitrarily determining whether or not air has been mixed into the ion exchanger and whether or not ion exchange efficiency of the ion exchanger has been degraded.

Further, this control method includes the steps of comparing the electric conductivity measured by the electric conductivity measuring unit with a predetermined electric conductivity range and arbitrarily determining whether or not air has been mixed into the ion exchanger and whether or not ion exchange efficiency of the ion exchanger has been degraded, based on a comparison result by an electric conductivity comparing unit.

In the present invention, simply by measuring the electric conductivity of the water inside the ion exchanger, it is possible to arbitrarily determine whether or not air has been mixed into the ion exchanger, and determine whether or not the ion exchange efficiency of the ion exchanger has been degraded. Therefore, with the simple and economical structure, reduction in the number of steps of maintenance operation is achieved easily.

Further, in the case where the electric conductivity measured by the electric conductivity measuring unit is low, it is determined that the air has been mixed into the ion exchanger. In this manner, with the relatively simple and economical structure, it becomes possible to detect mixing of the air into water. Therefore, it becomes possible to suppress degradation of the performance of the pure water pump due to air entailment, oxidation of reforming catalyst due to mixing of the air into the reformer, and instability of power generation voltage of the fuel cell due to carbon deposition on the electrodes. Moreover, reduction in the number of steps of maintenance operation is achieved easily.

Further, in the case where the electric conductivity measured by the electric conductivity measuring unit is high, it is determined that the ion exchange efficiency of the ion exchanger has been degraded. In this manner, with the relatively simple and economical structure, the timing for replacing the ion exchanger can be detected. The components to be inspected and replaced can be identified at early timing, and thus, reduction in the number of steps of maintenance operation is achieved easily.

BRIEF DESCRIPTION OF DRAWINGS

FIG. 11 is a table illustrating processing of the method;

DESCRIPTION OF EMBODIMENTS

Figure 1:
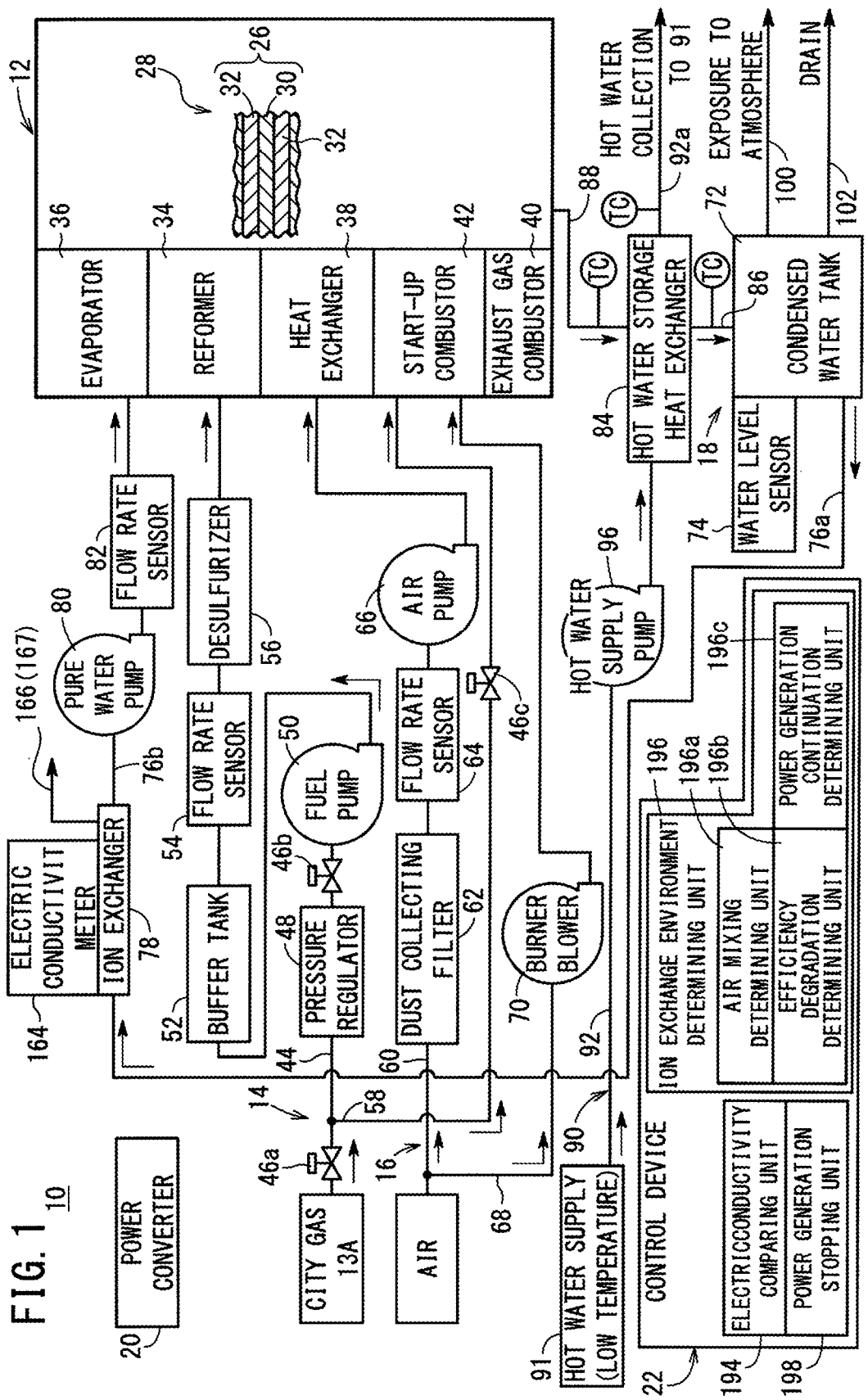
FIG. 1 is a diagram schematically showing structure of a fuel cell system according to a first embodiment of the present invention.

As shown in FIG. 1, a fuel cell system 10 according to a first embodiment of the present invention is used in a stationary application. However, the fuel cell system 10 can be used in various applications. For example, the fuel cell system 10 may be mounted in a vehicle.

The fuel cell system 10 includes a fuel cell module (SOFC module) 12 for generating electrical energy in power generation by electrochemical reactions of a fuel gas (e.g., mixed gas of a hydrogen gas, methane, and carbon monoxide) and an oxygen-containing gas (e.g., air), a fuel gas supply apparatus 14 for supplying a raw fuel (e.g., city gas) chiefly containing hydrocarbon as the fuel gas to the fuel cell module 12, an oxygen-containing gas supply apparatus 16 for supplying the oxygen-containing gas to the fuel cell module 12, a water supply apparatus 18 for supplying water to the fuel cell module 12, a power converter 20 for converting the direct current electrical energy generated in the fuel cell module 12 to electrical energy according to the requirements specification, and a control device 22 for controlling the amount of electrical energy generated in the fuel cell module 12. The fuel cell module 12, the fuel gas supply apparatus 14, the oxygen-containing gas supply apparatus 16, the water supply apparatus 18, the power converter 20, and the control device 22 are disposed in a single casing 24 (see FIGS. 2 to 4).

As shown in FIG. 1, the fuel cell module 12 includes a fuel cell stack 28 formed by stacking a plurality of solid oxide fuel cells 26 in a vertical direction (or in a horizontal direction). The fuel cells 26 are formed by stacking electrolyte electrode assemblies (MEA) 30 and separators 32. Though not shown, each of the electrolyte electrode assemblies 30 includes a cathode, an anode, and a solid electrolyte (solid oxide) interposed between the cathode and the anode. For example, the solid electrolyte is made of ion-conductive oxide such as stabilized zirconia.

The fuel cell module 12 includes a reformer 34 for reforming a mixed gas of a raw fuel and water vapor to produce a fuel gas (reformed gas) and supplying the fuel gas to the fuel cell stack 28, an evaporator 36 for evaporating water and supplying the water vapor to the reformer 34, a heat exchanger 38 for raising the temperature of the oxygen-containing gas by heat exchange with a combustion gas and supplying the oxygen-containing gas to the fuel cell stack 28, an exhaust gas combustor 40 for combusting the fuel gas discharged from the fuel cell stack 28 as a fuel exhaust gas and the oxygen-containing gas discharged from the fuel cell stack 28 as an oxygen-containing exhaust gas to produce the combustion gas, and a start-up combustor 42 for combusting the raw fuel and the oxygen-containing gas to produce the combustion gas.

The fuel gas supply apparatus 14 has a raw fuel channel 44 for supplying a city gas (13A) to the reformer 34. A pair of regulator valves 46a, 46b is provided at positions somewhere in the raw fuel channel 44, and a pressure regulator 48 is interposed between the regulator valves 46a, 46b. In the raw fuel channel 44, a fuel pump 50 is provided downstream of the regulator valve 46b. Further, a buffer tank 52, a flow rate sensor 54, and a desulfurizer 56 are provided downstream of the fuel pump 50, successively. In the raw fuel channel 44, a raw fuel branch channel 58 is provided between the regulator valve 46a and the pressure regulator 48. The raw fuel branch channel 58 is connected to the start-up combustor 42, and a regulator valve 46c is provided somewhere in the raw fuel branch channel 58.

The oxygen-containing gas supply apparatus 16 has an air supply pipe 60. A dust collecting filter 62, a flow rate sensor 64, and an air pump 66 are provided along the air supply pipe 60 from the upstream side to the downstream side. The air supply pipe 60 is connected to the heat exchanger 38. An air branch channel 68 is branched from the air supply pipe 60. A burner blower 70 is provided in the air branch channel 68, and the air branch channel 68 is connected to the start-up combustor 42. For example, the start-up combustor 42 has a burner. As described above, the raw fuel and the air are supplied to the start-up combustor 42.

The water supply apparatus 18 has a condensed water tank 72. A water level sensor 74 is provided at the condensed water tank 72, and a water channel (water supply pipe) 76a is connected to a lower position of the condensed water tank 72. The water channel 76a is connected to an ion exchanger 78, and a pure water channel (water discharge pipe) 76b extends from the ion exchanger 78. The pure water channel 76b is connected to the evaporator 36, and a pure water pump (water pump) 80 and a flow rate sensor 82 are provided at positions somewhere in the pure water channel 76b from the upstream side to the downstream side. A hot water storage heat exchanger 84 is connected to the condensed water tank 72 through a discharge water channel 86. The positions of the condensed water tank 72 and the ion exchanger 78 may be interchangeable.

The hot water storage heat exchanger 84 is connected to the heat exchanger 38 through an exhaust pipe 88. At the heat exchanger 38, a partially-consumed reactant gas discharged from the fuel cell stack 28 (hereinafter also referred to as the exhaust gas or combustion exhaust gas) and the air as heated fluid flow in a counterflow manner for heat exchange between these gases. The exhaust gas after the heat exchange is discharged into the exhaust pipe 88, and the air after the heat exchange is supplied to the fuel cell stack 28 as the oxygen-containing gas.

The hot water storage heat exchanger 84 is connected to a hot water supply pipe 92 extending from a hot water tank (hot water supply tank) 91 of a hot water server 90. A hot water supply pump 96 is provided in the hot water supply pipe 92 for supplying water at low temperature to the hot water storage heat exchanger 84. At the hot water storage heat exchanger 84, heat exchange between the supplied water and the exhaust gas is performed. The heated hot water is returned from a hot water supply pipe 92a to the hot water tank 91. A rated exhaust pipe (pipe which is exposed to the atmosphere during the rated operation) 100 and a drain pipe 102 are connected to the condensed water tank 72.

Figure 2:
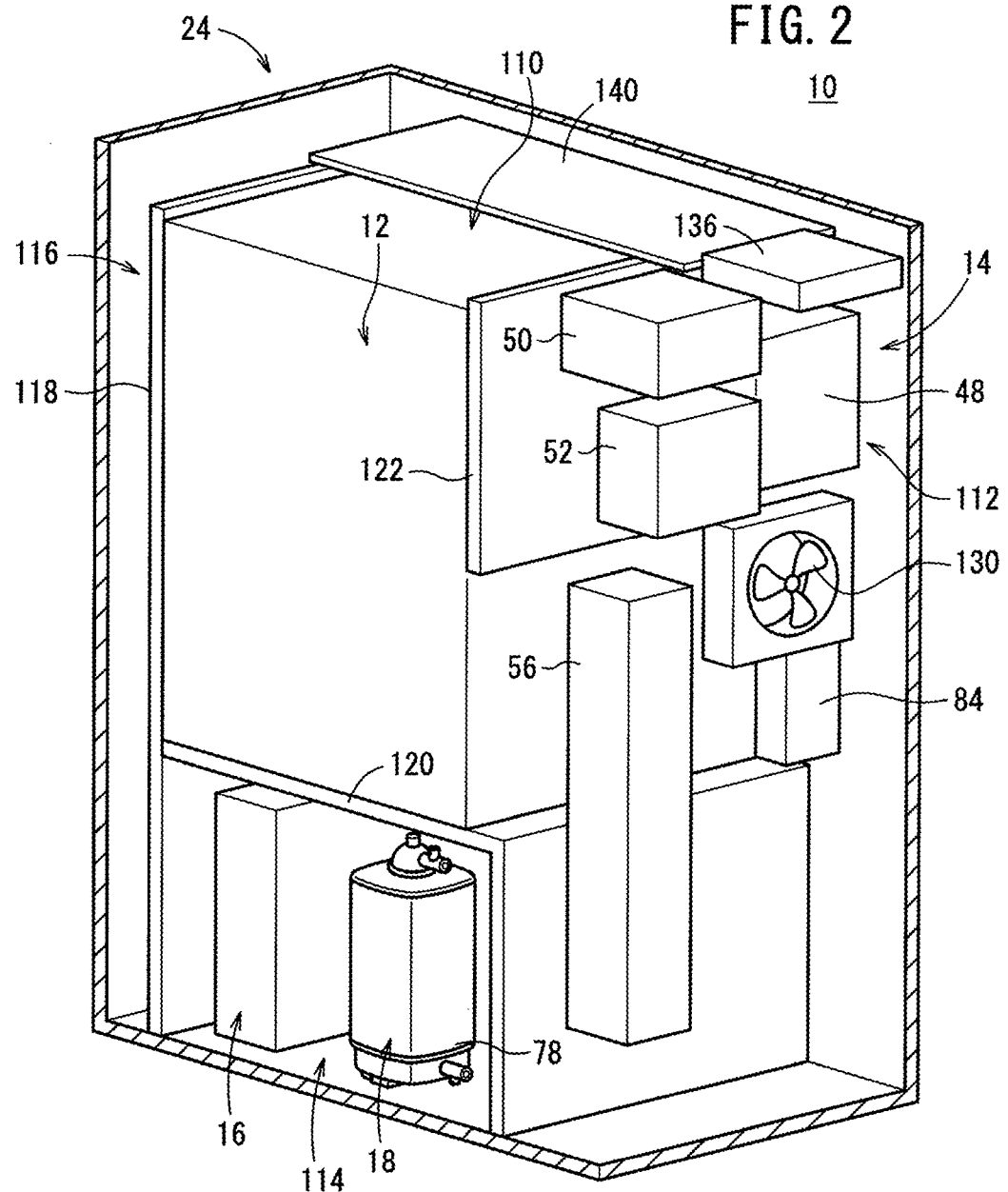
FIG. 2 is a perspective view schematically showing the fuel cell system as viewed from one side of the fuel cell system.
Figure 3:
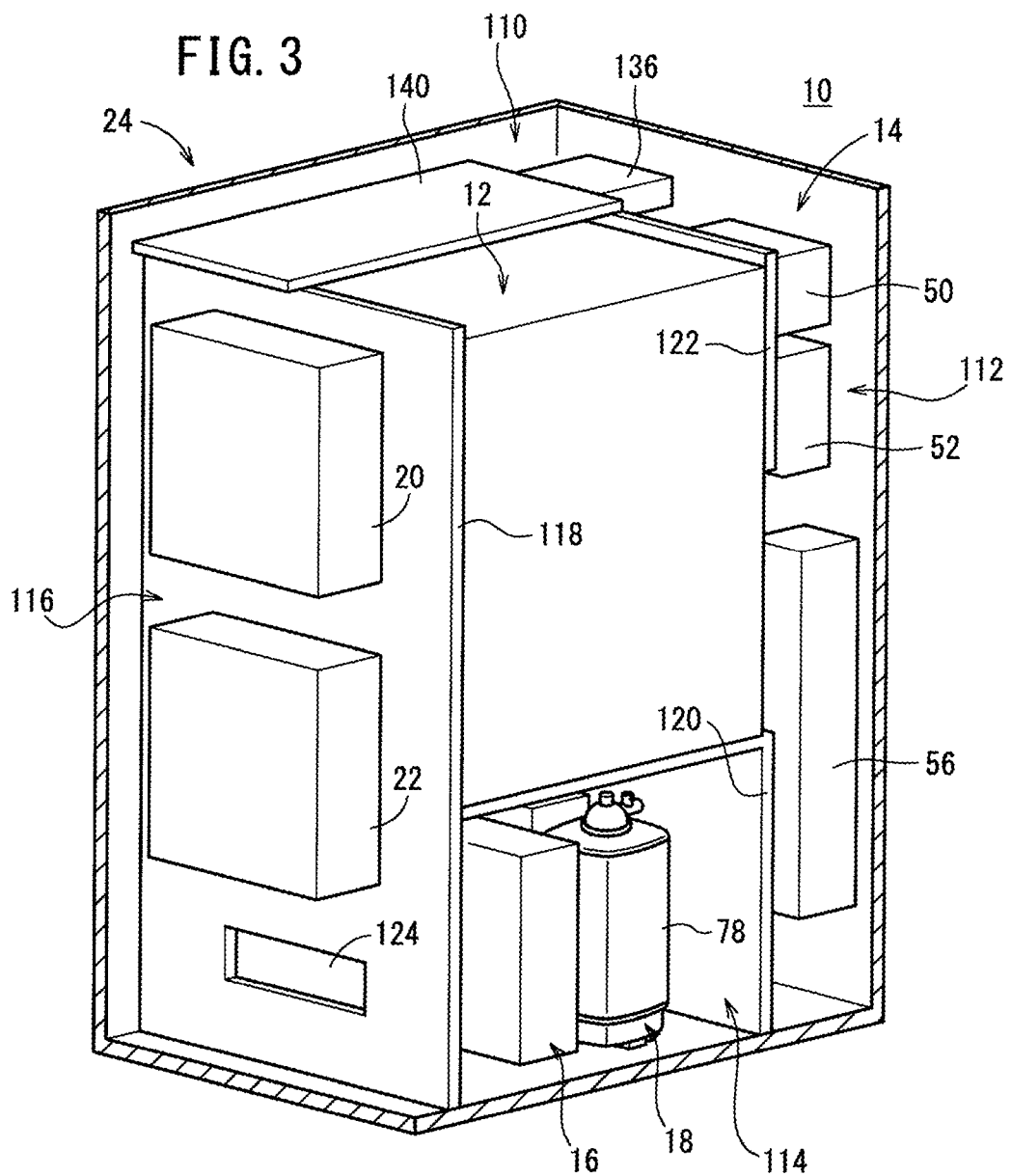
FIG. 3 is a perspective view schematically showing the fuel cell system as viewed from the other side of the fuel cell system.
Figure 4:
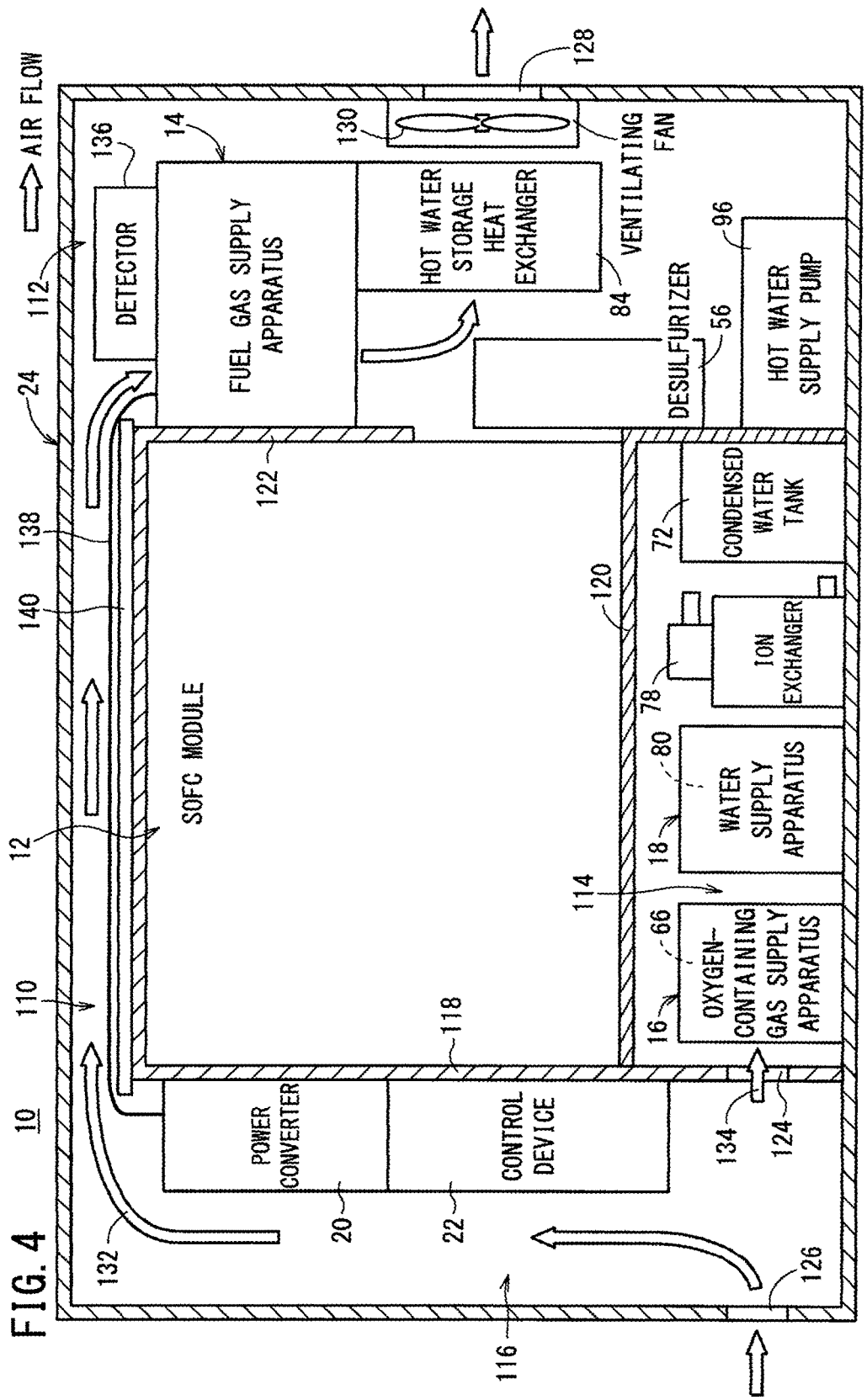
FIG. 4 is a diagram schematically showing the front side of the fuel cell system.

As shown in FIGS. 2 and 3, the casing 24 has a rectangular shape. As shown in FIG. 4, the space in the casing 24 is divided into a module section 110, a first fluid supply section 112, a second fluid supply section 114, and an electrical equipment section 116. The fuel cell module 12 is provided in the module section 110, the fuel gas supply apparatus 14 is provided in the first fluid supply section 112, the oxygen-containing gas supply apparatus 16 and the water supply apparatus 18 are provided in the second fluid supply section 114, and the power converter 20 and the control device 22 are provided in the electrical equipment section 116.

The module section 110, the first fluid supply section 112, the second fluid supply section 114, and the electrical equipment section 116 may be separated from one another using partition members. Alternatively, the module section 110, the first fluid supply section 112, the second fluid supply section 114, and the electrical equipment section 116 may be provided spatially separately in four areas by appearance. A vertical partition plate 118 extending vertically is provided in the casing 24 as a partition of the electrical equipment section 116. A base table 120 having an L-shape in cross section is provided at a lower position of the vertical partition plate 118. A short vertical partition plate 122 is provided adjacent to the first fluid supply section 112.

The module section 110 and the second fluid supply section 114 are provided between the first fluid supply section 112 and the electrical equipment section 116. The second fluid supply section 114 is provided under the module section 110. An air flow port 124 for guiding the air in the electrical equipment section 116 to the second fluid supply section 114 is provided between the electrical equipment section 116 and the second fluid supply section 114, i.e., in the vertical partition plate 118. The electrical equipment section 116 has an air supply port 126 for guiding the air outside the casing 24 into the casing 24. The air supply port 126 is formed in a side surface of the casing 24. The first fluid supply section 112 has an air discharge port 128 and a ventilating fan 130 for guiding the air inside the casing 24 to the outside of the casing 24. The air discharge port 128 is formed in a side surface of the casing 24.

A first ventilating channel 132 and a second ventilating channel 134 are formed inside the casing 24. The first ventilating channel 132 extends from the air supply port 126 to the electrical equipment section 116, an area above the module section 110, the first fluid supply section 112, and the air discharge port 128. The second ventilating channel 134 extends from the air supply port 126 to the electrical equipment section 116, the air flow port 124, and the second fluid supply section 114.

In the first fluid supply section 112, a fuel gas detector 136 for detecting leakage of the fuel gas, the desulfurizer 56 for removing sulfur component from the fuel gas, the fuel gas supply apparatus 14, the hot water storage heat exchanger 84 for performing heat exchange between the exhaust gas discharged from the fuel cell module 12 and the hot water supplied from the hot water tank 91, and the hot water supply pump 96 are provided.

In the second fluid supply section 114, the oxygen-containing gas supply apparatus 16, the condensed water tank 72 for storing condensed water obtained from the exhaust gas discharged from the fuel cell module 12, the ion exchanger 78 for flowing the condensed water, and the water supply apparatus 18 are provided.

In the electrical equipment section 116, the power converter 20 is provided above the control device 22. The ventilating fan 130 is provided between the hot water storage heat exchanger 84 and the air discharge port 128. A beam plate 140 is provided above the module section 110, and a cable 138 connecting the first fluid supply section 112 and the electrical equipment section 116 is placed on the beam plate 140.

The ion exchanger 78 is capable of removing impurities from the condensed water to obtain pure water. In addition to dust particles, the impurities herein include substances that are not contained in pure water, e.g., salts such as calcium, magnesium, silica, sodium, and potassium, water soluble electrolyte components, and organic substance.

Figure 5:
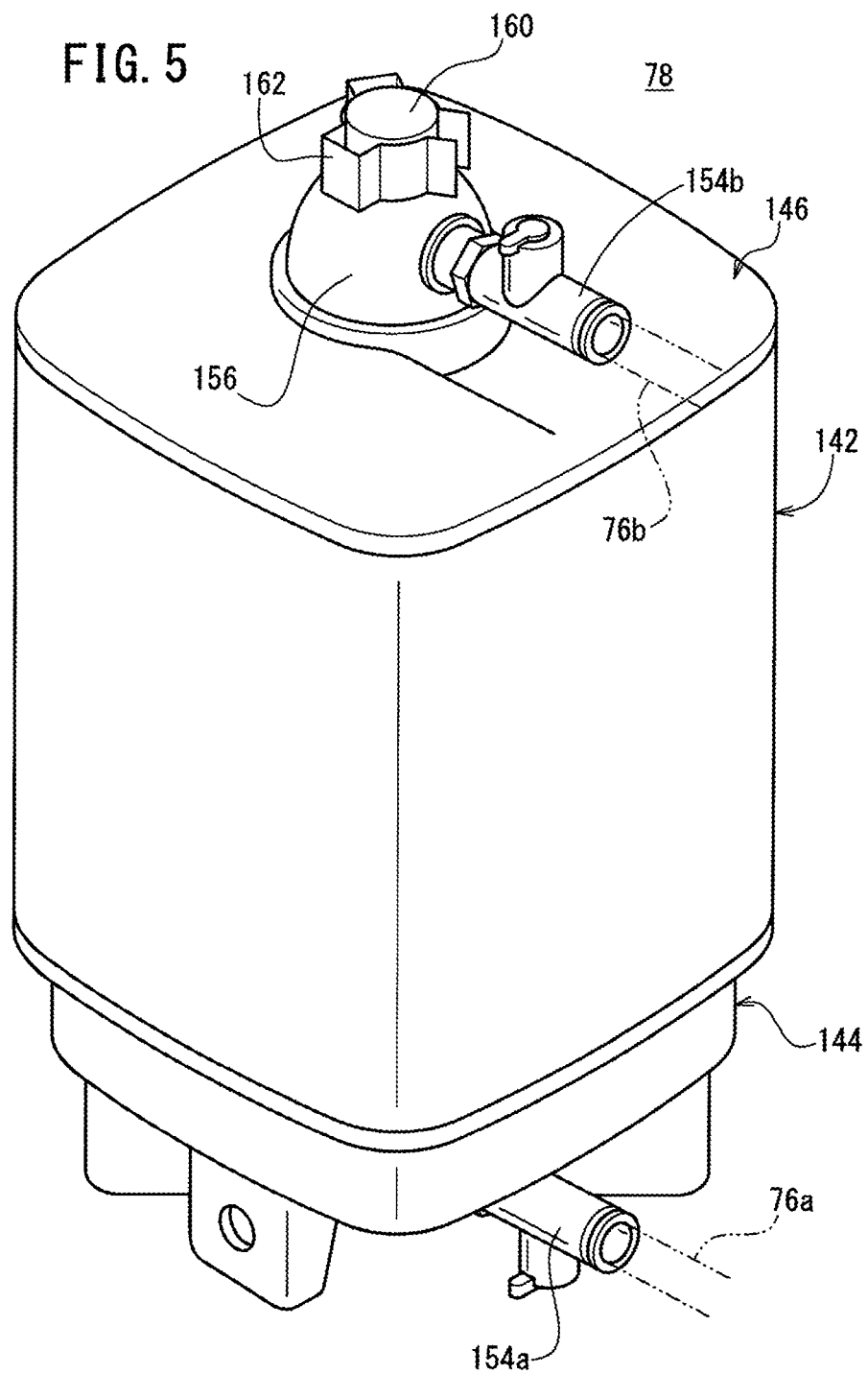
FIG. 5 is a perspective view schematically showing an ion exchanger of the fuel cell system.
Figure 6:
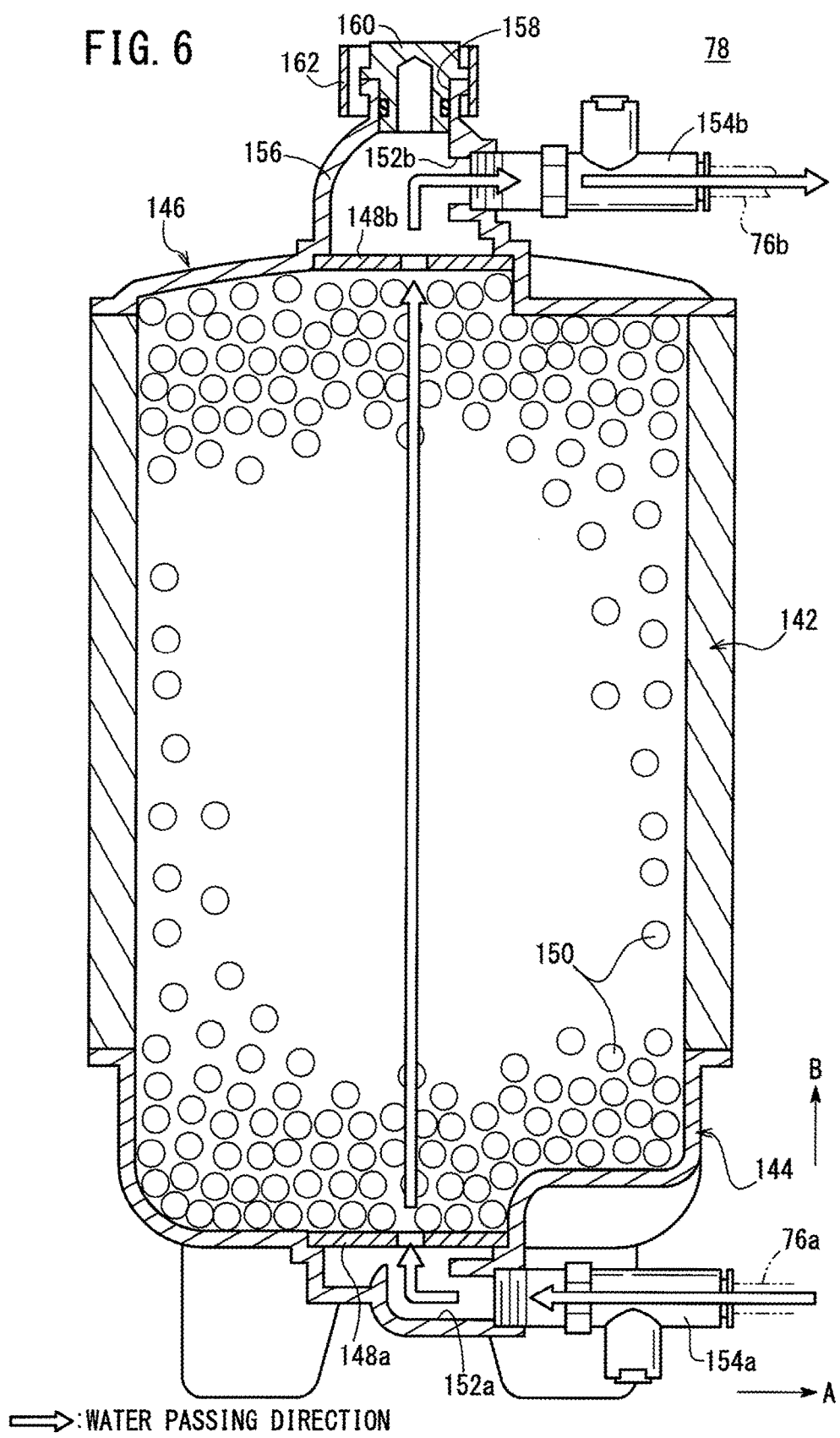
FIG. 6 is a vertical cross sectional view showing the ion exchanger.

As shown in FIGS. 5 and 6, the ion exchanger 78 includes a rectangular cylindrical apparatus body 142. A lower lid member 144 and an upper lid member 146 are attached to a lower end and an upper end of the apparatus body 142, respectively. As shown in FIG. 6, a lower filter 148a and an upper filter 148b are provided inside the apparatus body 142. For example, the lower filter 148a and the upper filter 148b are mesh filters. Particles of ion exchange resin 150 fill a space between the lower filter 148a and the upper filter 148b.

A water supply port 152a is provided at a lower position of the apparatus body 142, i.e., in the lower lid member 144, for supplying water (condensed water) into the ion exchange resin 150. A water discharge port 152b is provided at an upper position of the apparatus body 142, i.e., in the upper lid member 146, for discharging water which has passed through the ion exchange resin 150. The water supply port 152a extends in a horizontal direction (lateral direction) up to a lower central position of the apparatus body 142, and the water supply port 152a is opened upward from the lower central position into the apparatus body 142. This allows the water to flow from the central position of the lower filter 148a.

A water supply seal valve 154a is provided at the water supply port 152a. The water supply seal valve 154a is a one-touch cock for detachably connecting the water channel 76a. A water discharge seal valve 154b is provided at the water discharge port 152b. The water discharge seal valve 154b is a one-touch cock for detachably connecting the pure water channel 76b. The directions in which pipes are detached respectively from the water supply seal valve 154a and the water discharge seal valve 154b are the same (in the direction indicated by the arrow A). The directions in which pipes are connected respectively to the water supply seal valve 154a and the water discharge seal valve 154b are also the same.

An air container 156 is provided at an upper position of the apparatus body 142, i.e., in the upper lid member 146. The air container 156 contains the air mixed into the apparatus body 142 in a concentrated manner. The air container 156 has an upwardly curved dome shape, and the water discharge port 152b extending in the horizontal direction is connected to an upper portion of the air container 156. A connection port 158 is provided in the air container 156, at a position above the water discharge port 152b. The connection port 158 is opened upward in the direction of gravity (in the direction opposite to the gravity direction). A closure cap 160 is attached to the connection port 158, and the closure cap 160 is fixed to the air container 156 using a fixing member 162.

Figure 7:
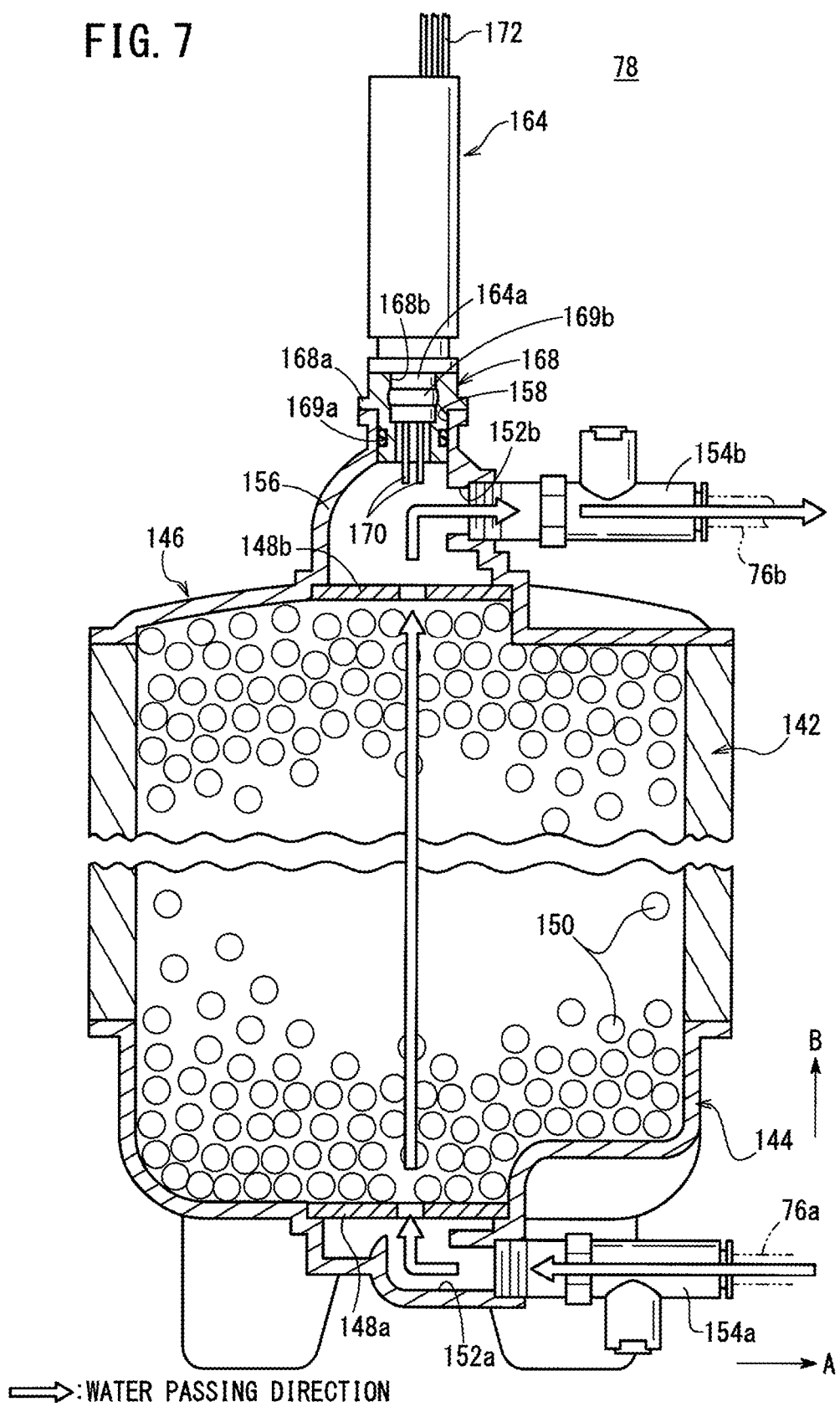
FIG. 7 is a vertical cross sectional view showing a state where an electric conductivity meter is attached to the ion exchanger.
Figure 8:
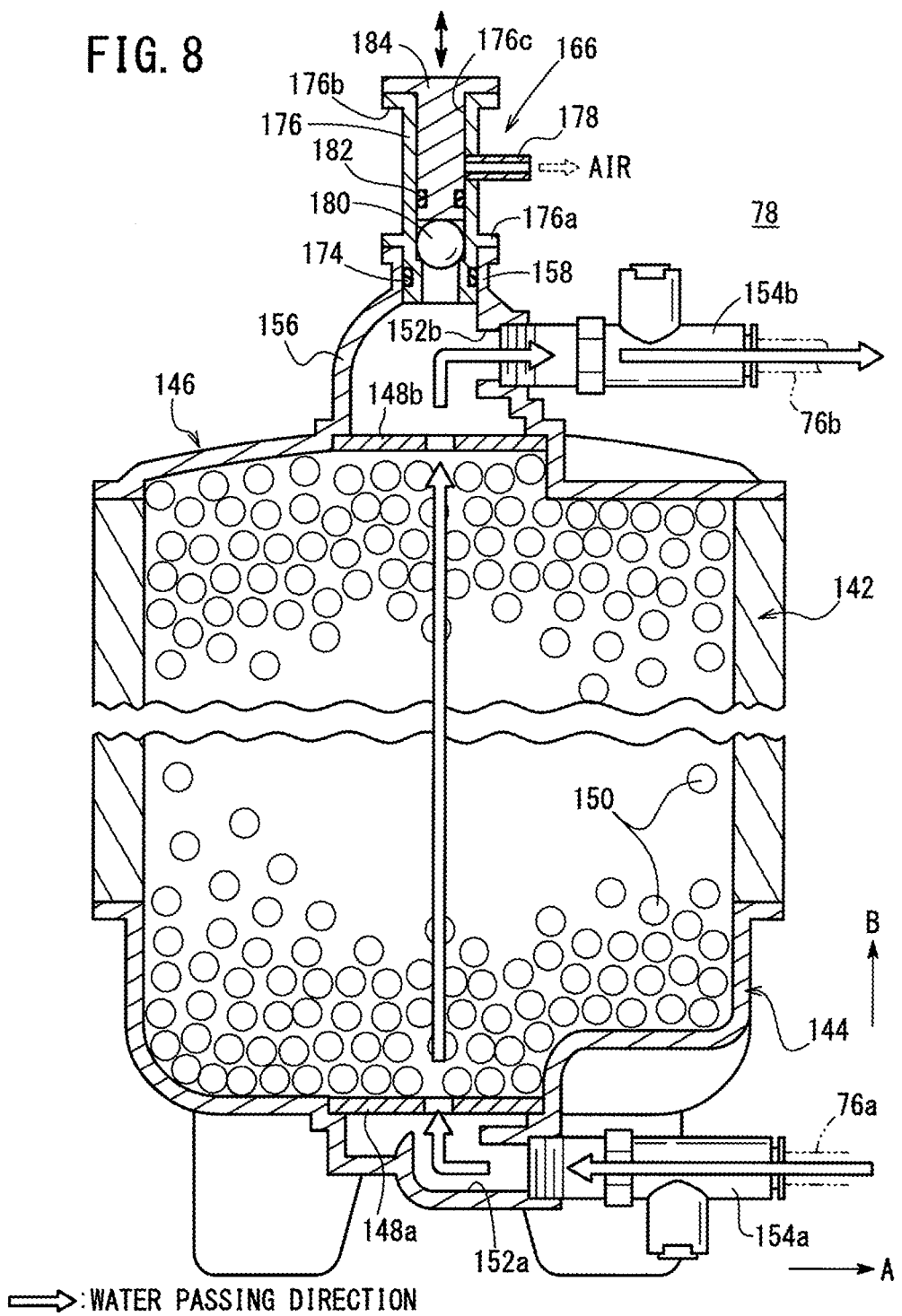
FIG. 8 is a vertical cross sectional view showing a state where an air discharge pipe is attached to the ion exchanger.
Figure 9:
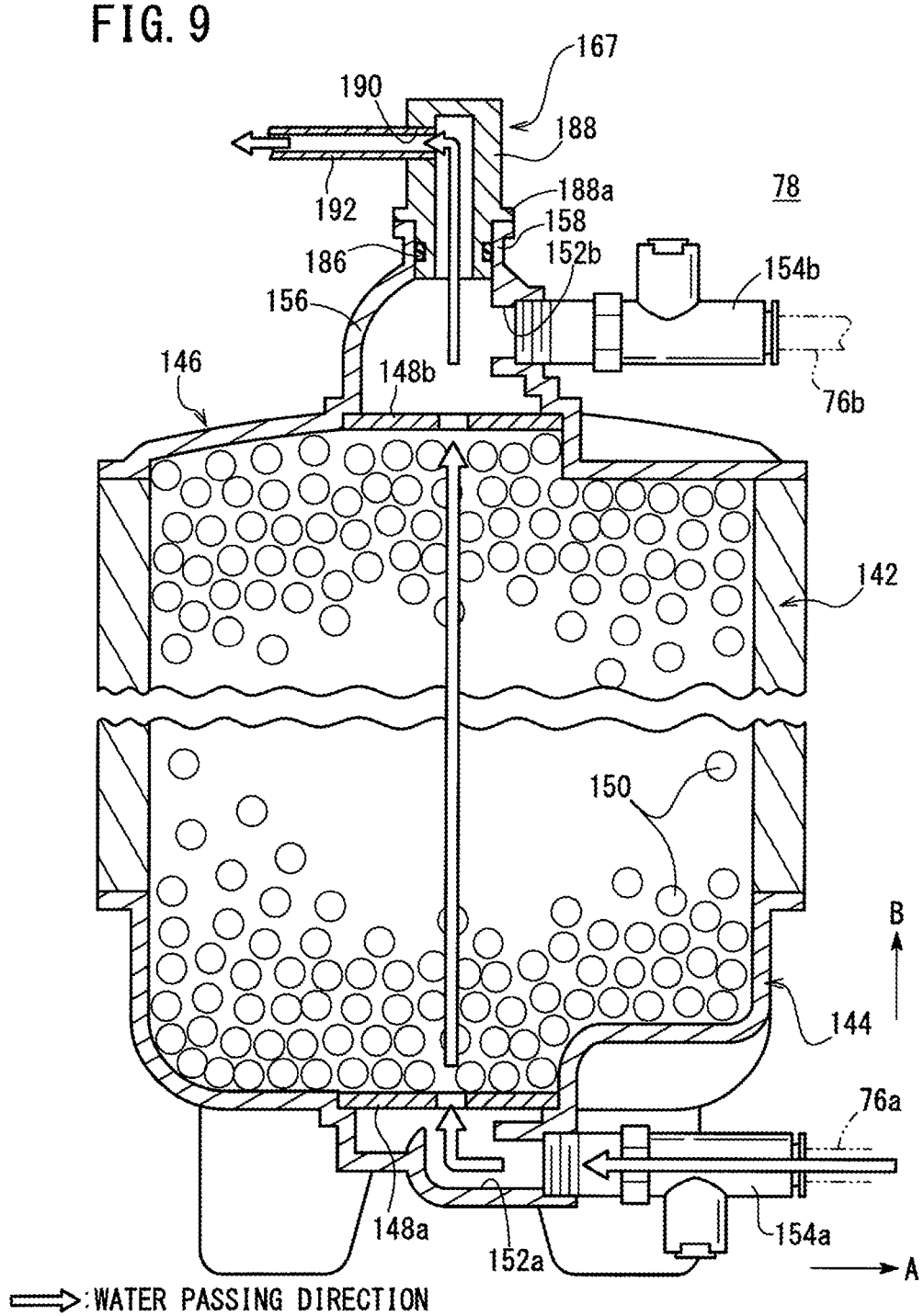
FIG. 9 is a vertical cross sectional view showing a state where a drain discharge pipe is attached to the ion exchanger.

Instead of the closure cap 160, an electric conductivity meter (electric conductivity measuring unit) 164 shown in FIG. 7, an air discharge pipe (excessive fluid discharge pipe) 166 shown in FIG. 8, or a drain discharge pipe (excessive fluid discharge pipe) 167 shown in FIG. 9 is attached to the connection port 158, selectively. The electric conductivity meter 164 has a function of measuring electric conductivity σ of the water which has passed through the ion exchange resin 150. The air discharge pipe 166 has a function of discharging the air from the apparatus body 142, and the drain discharge pipe 167 has a function of discharging the excessive water and the air from the apparatus body 142.

As shown in FIG. 7, a coupling cylindrical body 168 is attached to the connection port 158 through an O-ring 169a, and the electric conductivity meter 164 is attached to the coupling cylindrical body 168. The coupling cylindrical body 168 has a flange 168a which contacts an opened end of the connection port 158. A stepped hole 168b is formed in the coupling cylindrical body 168, and a front end 164a of the electric conductivity meter 164 having a small diameter is attached to the stepped hole 168b through an O-ring 169b.

A pair of measurement terminals 170 is provided at the front end 164a of the electric conductivity meter 164. The measurement terminals 170 are exposed to the inside of the air container 156. Preferably, front ends (lower ends) of the measurement terminals 170 are positioned above the water discharge port 152b. A harness 172 is provided at the rear end of the electric conductivity meter 164, and the harness 172 is connected to the control device 22.

As shown in FIG. 8, at the air discharge pipe 166, a cylindrical member 176 is attached to the connection port 158 through an O-ring 174. The cylindrical member 176 includes a flange 176a which contacts the opened end of the connection port 158, and a flange 176b expanded in diameter at its upper end. A discharge channel 178 for releasing air is provided between the flanges 176a, 176b. The discharge channel 178 is opened to the outside.

A stepped hole 176c is formed in the cylindrical member 176, and a ball 180 is provided in the stepped hole 176c. The ball 180 contacts a step of the stepped hole 176c to disconnect the air container 156 from the discharge channel 178. A piston 184 is positioned in the stepped hole 176c through an O-ring 182. The piston 184 is slidable vertically.

Instead of the piston 184, a screw member screwed to a screw groove (not shown) formed in the inner circumferential surface of the stepped hole 176c may be used. Further, instead of the piston 184 which is opened/closed by manual operation, a solenoid valve (not shown) for disconnecting the air container 156 from, and connecting the air container 156 to, the discharge channel 178 may be provided to automatically open/close the channel and release the air depending on the electric conductivity σ.

As shown in FIG. 9, the drain discharge pipe 167 includes a cylindrical member 188 attached to the connection port 158 through an O-ring 186. An upper end of the cylindrical member 188 is closed, and the cylindrical member 188 has a flange 188a which contacts an opened end of the connection port 158. A connection hole 190 is formed at an upper position of the cylindrical member 188. The connection hole 190 extends into the cylindrical member 188, and passes through the cylindrical member 188 in a horizontal (radial direction). One end of a drain pipe 192 is connected to the connection hole 190, and the other end of the drain pipe 192 is connected to, e.g., the condensed water tank 72.

As shown in FIG. 1, the control device 22 includes an electric conductivity comparing unit 194 for comparing the electric conductivity σ measured by the electric conductivity meter 164 with a predetermined electric conductivity range, and an ion exchange environment determining unit 196 for arbitrarily determining whether or not air has been mixed into the ion exchanger 78 and whether or not the ion exchange efficiency of the ion exchanger 78 has been degraded, based on the comparison result by the electric conductivity comparing unit 194.

Further, the control device 22 includes a power generation stopping unit 198 for stopping power generation of the fuel cell stack 28 when the ion exchange environment determining unit 196 determines that the air has been mixed into the ion exchanger 78, or the ion exchange environment determining unit 196 determines that the ion exchange efficiency of the ion exchanger 78 has been degraded.

The ion exchange environment determining unit 196 includes an air mixing determining unit 196a for determining that the air has been mixed into the ion exchanger 78 when it is detected that the measured electric conductivity σ is less than a lower limit value (5 μS/cm) of a predetermined electric conductivity range. The ion exchange environment determining unit 196 includes an efficiency degradation determining unit 196b for determining that the ion exchange efficiency of the ion exchanger 78 has been degraded when it is detected that the measured electric conductivity σ is more than an upper limit value (30 μS/cm) of the predetermined electric conductivity range. The ion exchange environment determining unit 196 includes a power generation continuation determining unit 196c for continuing power generation of the fuel cell stack 28 when it is detected that the measured electric conductivity σ is within the predetermined electric conductivity range (between 5 μS/cm and 30 μS/cm).

Operation of the fuel cell system 10 will be described below.

As shown in FIG. 1, at the time of starting operation of the fuel cell system 10, by operation of the fuel gas supply apparatus 14, a raw fuel such as the city gas (including $CH_4$, $C_2H_6$, $C_3H_8$, $C_4H_{10}$) is supplied to the raw fuel channel 44. The raw fuel from the raw fuel channel 44 flows through the raw fuel branch channel 58, and the raw fuel is supplied to the start-up combustor 42. In the meanwhile, in the oxygen-containing gas supply apparatus 16, by operation of the burner blower 70, the air flows through the air branch channel 68, and the air is supplied to the start-up combustor 42.

Therefore, the mixed gas of the raw fuel and the air is supplied into the start-up combustor 42, and the mixed gas is ignited to start combustion. Thus, the combustion gas is supplied to the heat exchanger 38, the reformer 34, and the evaporator 36 to heat (raise the temperature of) the heat exchanger 38, the reformer 34, and the evaporator 36.

Then, in the fuel gas supply apparatus 14, the fuel pump 50 is driven to supply the raw fuel from the raw fuel channel 44 to the desulfurizer 56. After sulfur is removed from the raw fuel at the desulfurizer 56, the raw fuel is supplied to the reformer 34. In the water supply apparatus 18, the water supplied to the pure water channel 76b through the pure water pump 80 is evaporated by the evaporator 36, and the water vapor is supplied to the reformer 34.

The mixed fuel of the raw fuel and the water vapor undergoes steam reforming in the reformer 34. Thus, hydrocarbon of $C_{2+}$ is removed (reformed), and a reformed gas chiefly containing methane is obtained. The reformed gas is supplied to the fuel cell stack 28. Thus, the methane in the reformed gas is reformed, and the hydrogen gas is obtained. The fuel gas chiefly containing the hydrogen gas is supplied to the anodes (not shown).

In the oxygen-containing gas supply apparatus 16, by operation of the air pump 66, the air is supplied to the air supply pipe 60. This air is supplied to the heat exchanger 38. While the air is moving along the heat exchanger 38, heat exchange between the air and the exhaust gas as described later is performed, and the air is heated to the determined temperature beforehand. The air heated by the heat exchanger 38 flows into the fuel cell stack 28, and the air is supplied to cathodes (not shown).

Thus, in each of the electrolyte electrode assemblies 30, electrochemical reactions of the fuel gas and the air are induced for generating electricity. The hot exhaust gas (at several hundred ° C.) discharged from each of the electrolyte electrode assemblies 30 flows through the heat exchanger 38 for heat exchange with the air. The exhaust gas heats the air to a desired temperature, and the temperature of the exhaust gas is decreased.

The exhaust gas is supplied to the evaporator 36 to evaporate water. After the exhaust gas passes through the evaporator 36, the exhaust gas is supplied to the hot water storage heat exchanger 84 through the exhaust pipe 88. Water at low temperature is supplied from the hot water tank 91 of the hot water server 90 to the hot water storage heat exchanger 84. In the hot water server 90, by operation of the hot water supply pump 96, water is supplied to the hot water supply pipe 92. The water flows into the hot water storage heat exchanger 84 for heat exchange with the exhaust gas. Thus, the heated hot water returns from the hot water supply pipe 92a to the hot water tank 91, and the hot water is utilized for home use.

Figure 10:
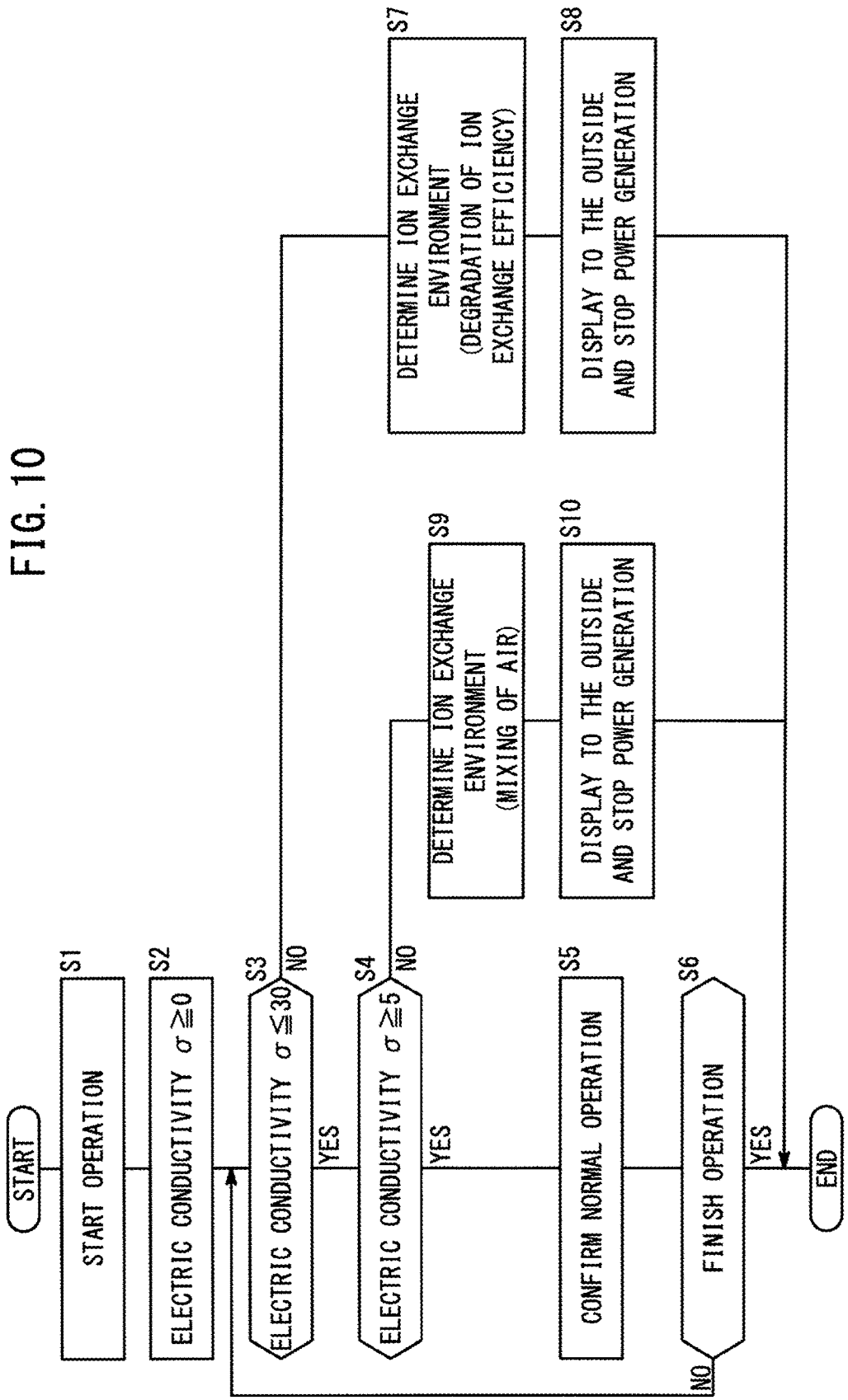
FIG. 10 is a flow chart illustrating a method of detecting a status of the ion exchanger based on the detection result by the electric conductivity meter.

Next, a control method according to the present invention will be described with reference to a flow chart in FIG. 10.

Firstly, in general, if the electric conductivity σ detected by the electric conductivity meter 164 is within a range between 5 μS/cm and 30 μS/cm, pure water is present. If the electric conductivity σ is within a range between 30 μS/cm and 50 μS/cm, condensed water is present. If the electric conductivity σ is less than 0.001 μS/cm, the air is present. S denotes siemens (1/Ω).

In the control device 22, as shown in FIG. 11, the status (environmental status) of the ion exchanger 78 is considered, and details of its processing are determined based on the value of the electric conductivity σ. If the electric conductivity σ is more than 30 μS/cm, it is considered that condensed water (water which has not been subjected to ion exchange) is present, and it is determined that the ion exchange efficiency is degraded. This information is displayed to the outside, and power generation is stopped. If the electric conductivity σ is within a range between 5 μS/cm and 30 μS/cm, it is considered that pure water is present, and power generation is continued. If the electric conductivity σ is less than 5 μS/cm, it is considered that the presence of the air has been detected, and it is determined that mixing of the air has occurred. This information is displayed to the outside, and power generation is stopped.

When operation of the fuel cell system 10 is started (step S1), the routine proceeds to step S2 to detect the electric conductivity σ (≥0) in the air container 156. If it is determined that the electric conductivity σ detected by the electric conductivity meter 164 is 30 μS/cm or less (YES in step S3), the routine proceeds to step S4.

In step S4, if it is determined that the electric conductivity σ detected by the electric conductivity meter 164 is 5 μS/cm or more (YES in step S4), i.e., if the electric conductivity σ is within a range between 5 μS/cm and 30 μS/cm, the routine proceeds to step S5 to confirm that operation is performed normally. Therefore, it is determined that ion exchange of the condensed water is performed properly and the pure water is obtained at the ion exchanger 78. Thus, the power generation is continued until operation is finished (YES in step S6).

In step S3, if it is determined that the electric conductivity σ detected by the electric conductivity meter 164 has exceeded 30 μS/cm (NO in step S3), the routine proceeds to ion exchange environment determination in step S7. In this step S7, it is determined that ion exchange efficiency has been degraded (the life of the ion exchange resin 150 has expired). Then, the routine proceeds to step S8 to display this information to the outside, and stop power generation.

Further, in step S4, if it is determined that the electric conductivity σ detected by the electric conductivity meter 164 is less than 5 μS/cm (NO in step S4), the routine proceeds to the ion exchange environment determination in step S9. In step S9, it is determined that mixing of the air (shortage of condensed water) has occurred. Then, the routine proceeds to step S10 to display this information to the outside, and stop power generation.

In the first embodiment, simply by measuring the electric conductivity σ of the water inside the ion exchanger 78 using the electric conductivity meter 164, it is possible to arbitrarily determine whether or not the air has been mixed into the ion exchanger 78, and determine whether or not the ion exchange efficiency of the ion exchanger 78 has been degraded. In this manner, with the simple and economical structure, reduction in the number of steps of maintenance operation is achieved easily.

Further, in the case where the electric conductivity σ measured by the electric conductivity meter 164 is low, specifically, when it is detected that the measured electric conductivity σ is less than 5 μS/cm, it is determined that the air has been mixed into the ion exchanger 78. In this manner, with the relatively simple and economical structure, it becomes possible to detect mixing of the air into water. Thus, it becomes possible to suppress degradation of the performance of the pure water pump 80 due to air entailment, oxidation of reforming catalyst due to mixing of the air into the reformer 34, and instability of power generation voltage of the fuel cell 26 due to carbon deposition on the electrodes. Moreover, reduction in the number of steps of maintenance operation can be achieved.

Further, in the case where the electric conductivity σ measured by the electric conductivity meter 164 is high, specifically, if it is detected that the measured electric conductivity σ is more than 30 μS/cm, it is determined that the ion exchange efficiency of the ion exchanger 78 has been degraded. Therefore, with the relatively simple and economical structure, the timing for replacing the ion exchanger 78 can be detected. The components to be inspected and replaced can be identified at early timing, and thus, reduction in the number of steps of maintenance operation is achieved easily.

Further, if it is detected that the electric conductivity σ measured by the electric conductivity meter 164 is within the range between 5 μS/cm and 30 μS/cm, power generation of the fuel cell stack 28 is continued. Therefore, since power generation of the fuel cell stack 28 is continued in the case where the electric conductivity σ is normal, it becomes possible to suppress occurrence of problems related to water as much as possible. Accordingly, improvement in the durability of the fuel cell system 10 is achieved suitably.

Further, the control device 22 includes the power generation stopping unit 198 for stopping power generation of the fuel cell stack 28 when the ion exchange environment determining unit 196 determines that air has been mixed into the ion exchanger 78, or the ion exchange environment determining unit 196 determines that the efficiency in the ion exchanger 78 has been degraded. Thus, since power generation of the fuel cell stack 28 is stopped beforehand in the case where the fuel cell 10 needs to be inspected, the time required for stopping power generation is reduced, and operation for replacing parts or components can be performed rapidly and smoothly.

Further, the ion exchanger 78 is advantageous when it is used for the solid oxide fuel cell 26 where impurities contained in at least water used for steam reforming are removed. However, instead of the solid oxide fuel cell 26, the present invention is also suitably applicable to the other types of high temperature fuel cells and medium temperature fuel cells. For example, molten-carbonate fuel cells (MCFC), phosphoric acid fuel cells (PAFC), and hydrogen membrane fuel cells (HMFC) can be adopted suitably.

Figure 12:
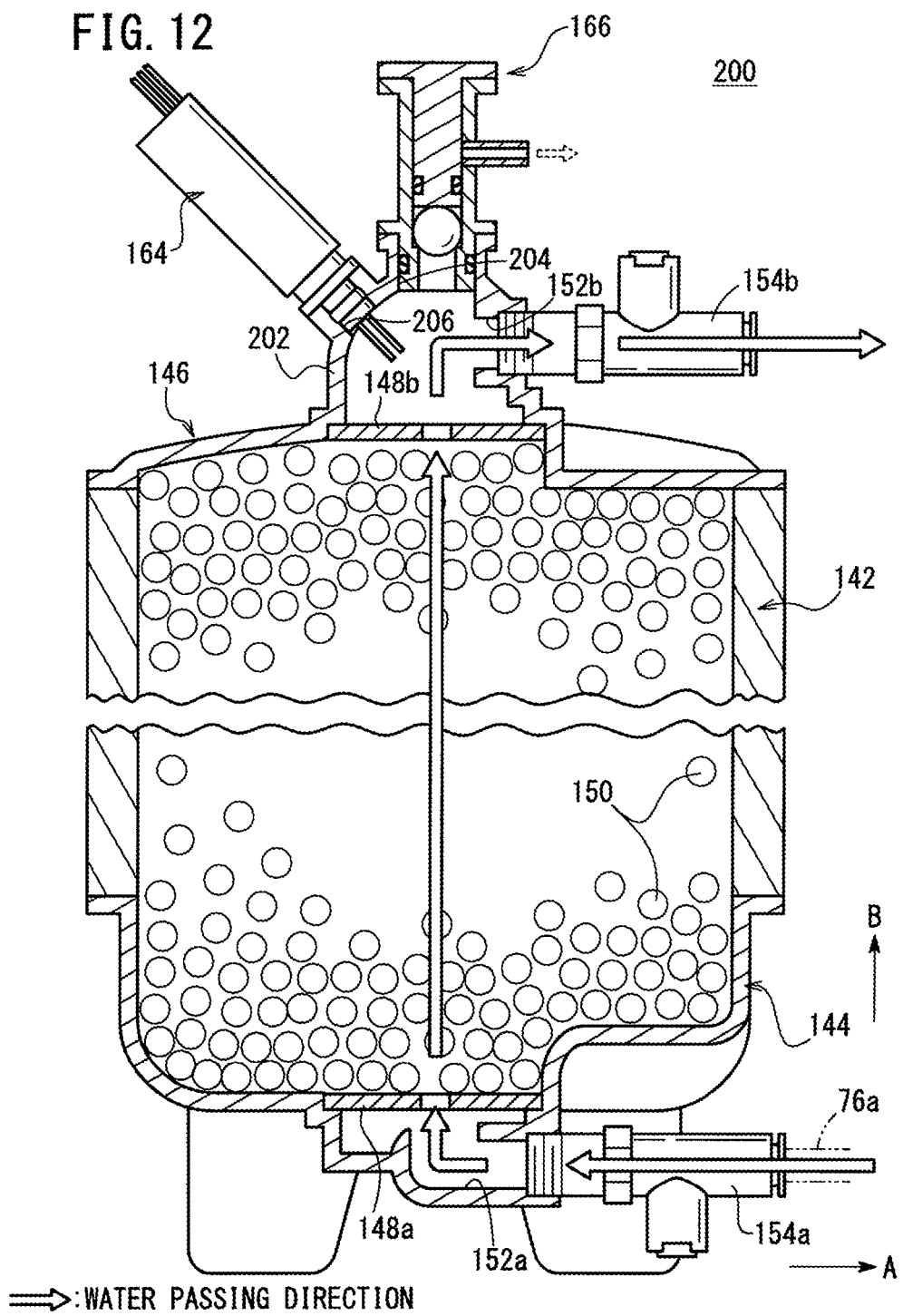
FIG. 12 is a vertical cross sectional view showing an ion exchanger of a fuel cell system according to a second embodiment of the present invention.
Figure 13:
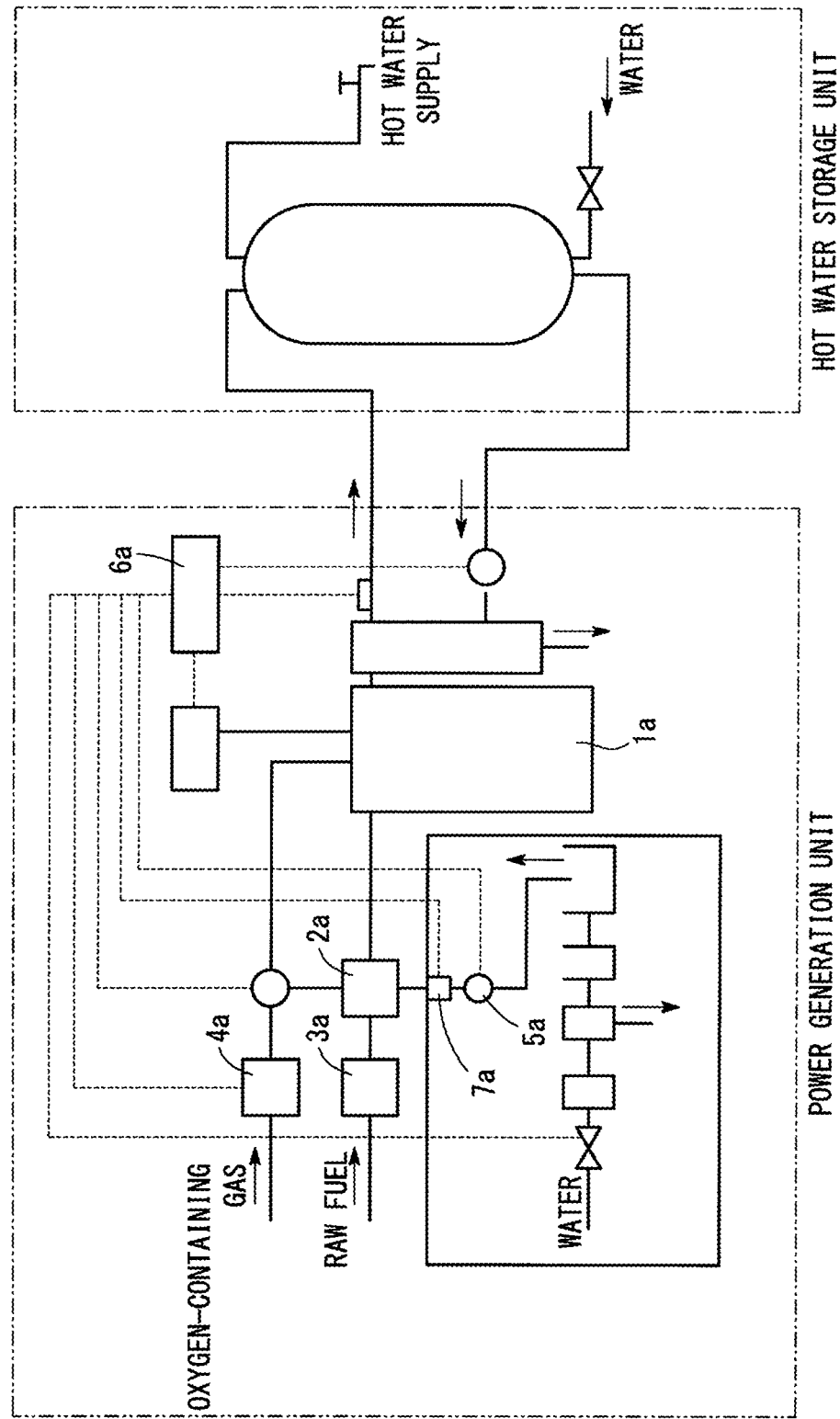
FIG. 13 is a diagram schematically showing structure of a fuel cell device of the conventional technique 1.
Figure 14:
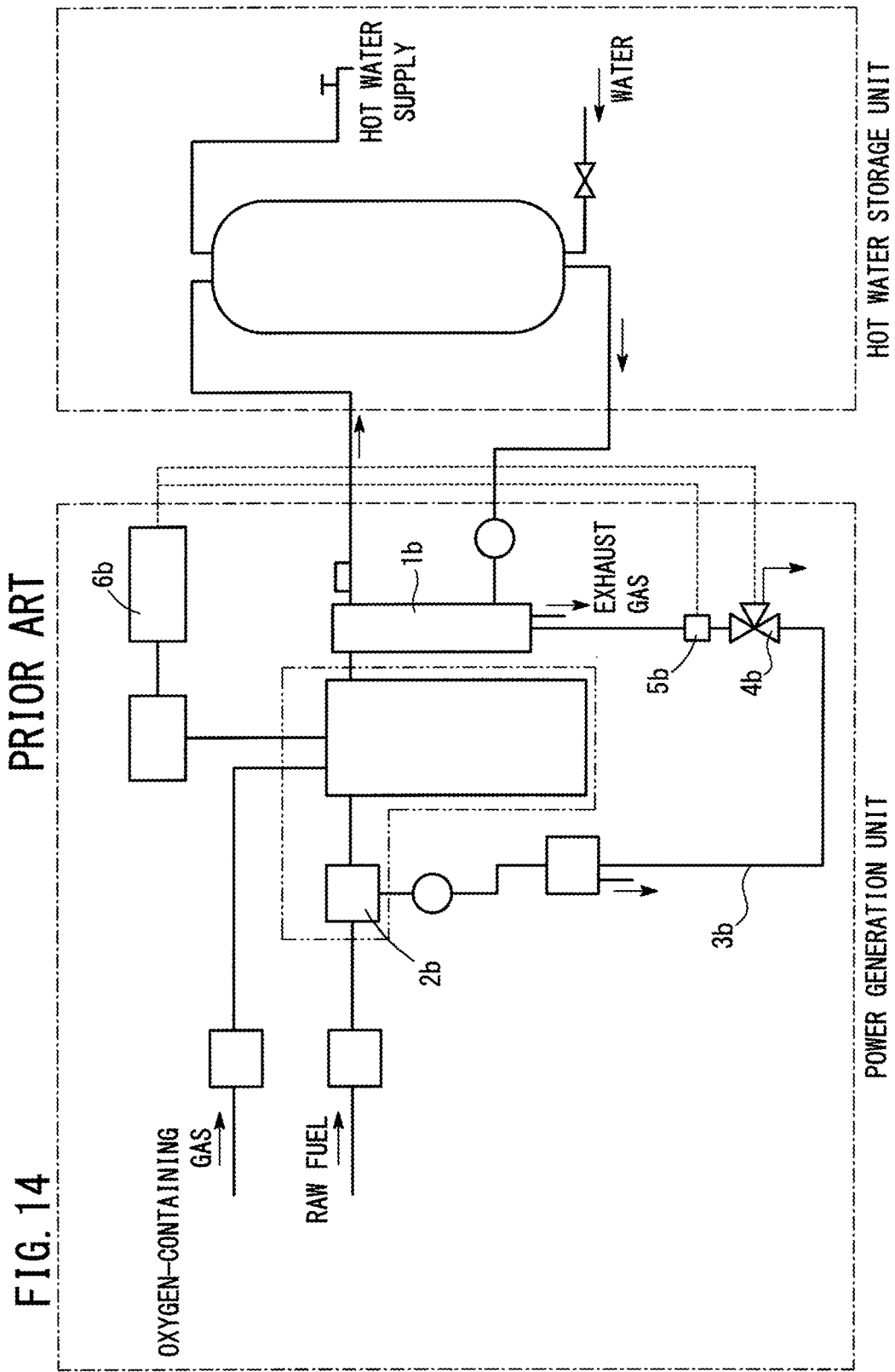
FIG. 14 is a diagram schematically showing structure of a fuel cell device of the conventional technique 2.
Figure 15:
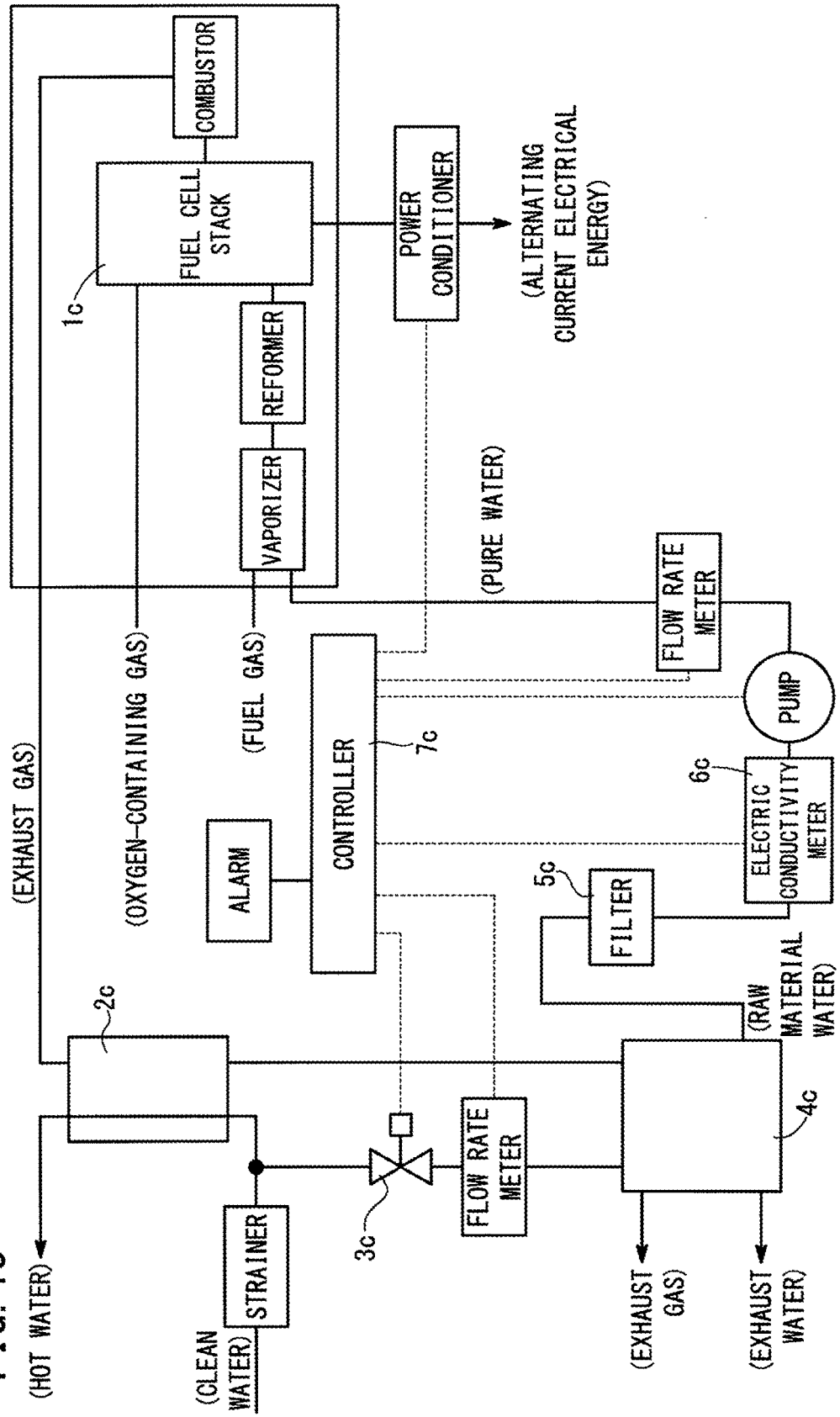
FIG. 15 is a diagram schematically showing structure of a fuel cell device of the conventional technique 3.

FIG. 12 is a vertical cross sectional view showing an ion exchanger 200 of a fuel cell system according to a second embodiment of the present invention. The constituent elements of the ion exchanger 200 that are identical to those of the ion exchanger 78 according to the first embodiment are labeled with the same reference numerals, and descriptions thereof will be omitted.

An upper lid member 146 of the ion exchanger 200 has an air container 202 containing the air mixed into the apparatus body 142 in a concentrated manner. The air container 202 has a connection port 204 at a position above a water discharge port 152b, and the connection port 204 is opened upward in the direction of gravity. An air discharge pipe 166 (or a drain discharge pipe 167) is attached to this connection port 204. An attachment hole 206 is formed at an upper position of the air container 202 where the attachment hole 206 does not interfere with the air discharge pipe 166. The attachment hole 206 is inclined downward. An electric conductivity meter 164 is attached to the attachment hole 206.

In the second embodiment, the electric conductivity meter 164 and the air discharge pipe 166 are attached to the air container 202. Therefore, the electric conductivity σ of the water which has passed through the ion exchange resin 150 is measured for making it possible to detect stagnation of the air and degradation of the ion exchange efficiency, and discharge the air suitably. Thus, the same advantages as in the case of the first embodiment are achieved. For example, ion exchange is performed reliably to achieve improvement in the ion exchange efficiency, and it becomes possible to suppress instability of the power generation voltage due to air entailment.

The invention claimed is:

1. A fuel cell system comprising:
a fuel cell stack formed by stacking a plurality of fuel cells for generating electrical energy by electrochemical reactions of a fuel gas and an oxygen-containing gas;
an ion exchanger, water contained in an exhaust gas discharged from the fuel cells passing through the ion exchanger;
an electric conductivity measuring unit for measuring electric conductivity of the water inside the ion exchanger; and
a control device configured to control an amount of electrical energy generated in the fuel cell stack,
wherein the control device includes an electric conductivity comparing unit configured to compare the electric conductivity measured by the electric conductivity measuring unit with a predetermined electric conductivity range; and
an ion exchange environment determining unit configured to arbitrarily determine whether or not air has been mixed into the ion exchanger and whether or not ion exchange efficiency of the ion exchanger has been degraded, based on a comparison result by the electric conductivity comparing unit.

2. The fuel cell system according to claim 1, further comprising a power generation stopping unit configured to stop power generation of the fuel cell stack when the ion exchange environment determining unit determines that the air has been mixed into the ion exchanger, or when the ion exchange environment determining unit determines that the ion exchange efficiency in the ion exchanger has been degraded.

3. The fuel cell system according to claim 1, wherein the ion exchange environment determining unit includes an air mixing determining unit configured to determine that the air has been mixed into the ion exchanger when it is detected that the measured electric conductivity is less than a lower limit value of the predetermined electric conductivity range.

4. The fuel cell system according to claim 1, wherein the ion exchange environment determining unit includes an efficiency degradation determining unit configured to determine that the ion exchange efficiency of the ion exchanger has been degraded when it is detected that the measured electric conductivity is more than an upper limit value of the predetermined electric conductivity range.

5. The fuel cell system according to claim 1, wherein the ion exchange environment determining unit includes a power generation continuation determining unit configured to continue power generation of the fuel cell stack when it is detected that the measured electric conductivity is within the predetermined electric conductivity range.

6. The fuel cell system according to claim 1, wherein the ion exchanger is applicable to a solid oxide fuel cell, for removing impurities contained in at least water used for steam reforming.

7. A method of controlling a fuel cell system, the fuel cell system comprising:
a fuel cell stack formed by stacking a plurality of fuel cells for generating electrical energy by electrochemical reactions of a fuel gas and an oxygen-containing gas;
an ion exchanger, water contained in an exhaust gas discharged from the fuel cells passing through the ion exchanger;
an electric conductivity measuring unit for measuring electric conductivity of the water inside the ion exchanger; and
a control device for controlling an amount of electrical energy generated in the fuel cell stack,
the method comprising the steps of:
comparing the electric conductivity measured by the electric conductivity measuring unit with a predetermined electric conductivity range; and
arbitrarily determining whether or not air has been mixed into the ion exchanger and whether or not ion exchange efficiency of the ion exchanger has been degraded, based on a comparison result by an electric conductivity comparing unit.

8. The control method according to claim 7, further comprising the step of stopping power generation of the fuel cell stack when it is determined that the air has been mixed into the ion exchanger, or it is determined that the ion exchange efficiency in the ion exchanger has been degraded.

9. The control method according to claim 7, wherein it is determined that the air has been mixed into the ion exchanger when it is detected that the measured electric conductivity is less than a lower limit value of the predetermined electric conductivity range.

10. The control method according to claim 7, wherein it is determined that the ion exchange efficiency of the ion exchanger has been degraded when it is detected that the measured electric conductivity is more than an upper limit value of the predetermined electric conductivity range.

11. The control method according to claim 7, wherein power generation of the fuel cell stack is continued when it is detected that the measured electric conductivity is within the predetermined electric conductivity range.

12. The control method according to claim 7, wherein the ion exchanger is applicable to a solid oxide fuel cell, for removing impurities contained in at least water used for steam reforming.

* * * * *